United States Patent
Yoon et al.

(10) Patent No.: US 9,928,959 B2
(45) Date of Patent: Mar. 27, 2018

(54) DIELECTRIC CERAMIC COMPOSITION AND MULTILAYER CERAMIC CAPACITOR CONTAINING THE SAME

(71) Applicant: SAMSUNG ELECTRO-MECHANICS CO., LTD., Suwon-si, Gyeonggi-do (KR)

(72) Inventors: Seok Hyun Yoon, Suwon-si (KR); Sung Kwon Wi, Suwon-si (KR); Jung Deok Park, Suwon-si (KR); Jung Wook Seo, Suwon-si (KR); Chan Hee Nam, Suwon-si (KR); Dong Hun Kim, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/065,553

(22) Filed: Mar. 9, 2016

(65) Prior Publication Data
US 2017/0011851 A1    Jan. 12, 2017

(30) Foreign Application Priority Data
Jul. 6, 2015   (KR) .................. 10-2015-0095993

(51) Int. Cl.
*H01G 4/12*   (2006.01)
*C04B 35/468*   (2006.01)
(Continued)

(52) U.S. Cl.
CPC ....... *H01G 4/1227* (2013.01); *C04B 35/4684* (2013.01); *H01G 4/0085* (2013.01);
(Continued)

(58) Field of Classification Search
CPC ............ C04B 35/4682; C04B 35/4684; H01G 4/1227; H01G 4/1218
See application file for complete search history.

(56) References Cited

U.S. PATENT DOCUMENTS

| | | | | |
|---|---|---|---|---|
| 2,467,169 A | * | 4/1949 | Wainer | ................... C04B 35/47 252/62.9 R |
| 4,530,031 A | * | 7/1985 | Donohue | ............ C04B 35/4682 361/321.5 |
| 5,117,326 A | * | 5/1992 | Sano | ................... C04B 35/4684 361/321.4 |
| 5,432,136 A | * | 7/1995 | Shibata | ............... C04B 35/4684 501/138 |

(Continued)

FOREIGN PATENT DOCUMENTS

| | | |
|---|---|---|
| JP | 2002-100516 A | 4/2002 |
| JP | 2007-217623 A | 8/2007 |
| KR | 1999-0075846 A | 10/1999 |

*Primary Examiner* — Karl Group
(74) *Attorney, Agent, or Firm* — McDermott Will & Emery LLP (57) ABSTRACT

A dielectric ceramic composition and a multilayer ceramic capacitor containing the same are provided. The dielectric ceramic composition contains a base material powder represented by $(1-x)BaTiO_3-xPbTiO_3$ containing a first main ingredient represented by $BaTiO_3$ and a second main ingredient represented by $PbTiO_3$, wherein x satisfies $0.0025 \leq x \leq 0.4$. The multilayer ceramic capacitor includes a ceramic body in which dielectric layers containing the dielectric ceramic composition are alternately stacked with first and second internal electrodes, and first and second external electrodes formed on both end portions of the ceramic body and respectively electrically connected to the first and second internal electrodes.

13 Claims, 2 Drawing Sheets

(51) Int. Cl.
  *C04B 35/472* (2006.01)
  *H01G 4/30* (2006.01)
  *H01G 4/248* (2006.01)
  *H01G 4/008* (2006.01)

(52) U.S. Cl.
  CPC ........... *H01G 4/1218* (2013.01); *H01G 4/248* (2013.01); *H01G 4/30* (2013.01); *C04B 2235/3203* (2013.01); *C04B 2235/3239* (2013.01); *C04B 2235/3241* (2013.01); *C04B 2235/3267* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3418* (2013.01); *C04B 2235/36* (2013.01); *C04B 2235/785* (2013.01); *C04B 2235/786* (2013.01); *C04B 2237/68* (2013.01)

(56) References Cited

U.S. PATENT DOCUMENTS

| | | | |
|---|---|---|---|
| 5,680,291 A * | 10/1997 | Kim | C04B 35/499 361/321.1 |
| 6,187,707 B1 * | 2/2001 | Kakihara | H01C 7/025 501/138 |
| 6,243,254 B1 * | 6/2001 | Wada | C04B 35/465 361/311 |
| 6,534,429 B1 * | 3/2003 | Jackson | C04B 35/462 423/598 |
| 6,734,127 B2 * | 5/2004 | Kuo | C04B 35/4682 501/138 |
| 7,592,886 B2 * | 9/2009 | Saito | C04B 35/462 333/219 |
| 2011/0235236 A1 * | 9/2011 | Ikeda | C04B 35/4682 361/321.4 |

\* cited by examiner

DIELECTRIC CERAMIC COMPOSITION AND MULTILAYER CERAMIC CAPACITOR CONTAINING THE SAME

CROSS-REFERENCE TO RELATED APPLICATION

This application claims the priority and benefit of Korean Patent Application No. 10-2015-0095993, filed on Jul. 6, 2015 with the Korean Intellectual Property Office, the disclosure of which is incorporated herein by reference.

BACKGROUND

The present disclosure relates to a novel dielectric ceramic composition having excellent direct current (DC)-bias characteristics and a multilayer ceramic capacitor containing the same.

In general, electronic components using a ceramic material, such as capacitors, inductors, piezoelectric elements, varistors, thermistors, or the like, include a ceramic body formed of a ceramic material, internal electrodes formed in the ceramic body, and external electrodes mounted on a surface of the ceramic body to be connected to the internal electrodes.

Among ceramic electronic components, a multilayer ceramic capacitor includes a plurality of stacked dielectric layers, internal electrodes disposed to face each other with each of the dielectric layers interposed therebetween, and external electrodes electrically connected to the internal electrodes.

Multilayer ceramic capacitors have been widely used as components for mobile communications devices such as computers, personal data assistants (PDAs), mobile phones, and the like, due to advantages such as compact size, high capacitance, ease of mountablity, and the like.

In general, a multilayer ceramic capacitor is manufactured by stacking a paste for an internal electrode and a paste for a dielectric layer using a sheet method, a printing method, or the like, and simultaneously sintering the stacked pastes.

Recently, with the development of a high capacitance multilayer ceramic capacitor, a thickness of the dielectric layer has been reduced. As a result of the reduction in thickness of the dielectric layer, problems related to reliability, high-temperature withstand voltage characteristics, and short-circuit defects have occurred.

In order to solve these problems, fine barium titanate particles have been used. Furthermore, since it can be difficult to obtain high capacitance, a method has been developed to provide a high capacitance multilayer ceramic capacitor having excellent reliability by using the fine particles but increasing a grain size.

However, in a case of increasing the grain size of barium titanate, permittivity may be increased, but DC-bias characteristics may be deteriorated. That is, when a DC voltage is applied, a capacitance decrease rate may be increased.

As the grain size is increased, the DC-bias characteristics may be further deteriorated. Therefore, in order to solve this problem, a dielectric material capable of implementing high permittivity and having a small grain size may be needed.

SUMMARY

An aspect of the present disclosure may provide a novel dielectric ceramic composition having excellent DC-bias characteristics and a multilayer ceramic capacitor containing the same.

According to an aspect of the present disclosure, a dielectric ceramic composition contains a base material powder represented by $(1-x)BaTiO_3-xPbTiO_3$ containing a first main ingredient represented by $BaTiO_3$ and a second main ingredient represented by $PbTiO_3$, where x satisfies $0.0025 \leq x \leq 0.4$.

According to another aspect of the present disclosure, a multilayer ceramic capacitor includes a ceramic body in which dielectric layers and first and second internal electrodes are alternately stacked, and first and second external electrodes formed on end portions of the ceramic body and respectively electrically connected to the first and second internal electrodes. The dielectric layers contain a dielectric ceramic composition containing a base material powder represented by $(1-x)BaTiO_3-xPbTiO_3$ containing a first main ingredient represented by $BaTiO_3$ and a second main ingredient represented by $PbTiO_3$, where x satisfies $0.0025 \leq x \leq 0.4$.

According to a further aspect of the present disclosure, a multilayer ceramic capacitor includes pluralities of first and second internal electrodes that are alternately stacked, and a plurality of dielectric layers disposed between adjacent internal electrodes of the stacked first and second internal electrodes. The dielectric layers contain a dielectric ceramic composition containing $PbTiO_3$.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

The present disclosure relates to a dielectric ceramic composition. Examples of electronic components containing the dielectric ceramic composition include capacitors, inductors, piezoelectric elements, varistors, thermistors, or the like. Hereinafter, the dielectric ceramic composition and a multilayer ceramic capacitor as an example of the electronic component will be described.

A dielectric ceramic composition according to an exemplary embodiment may contain a base material powder represented by $(1-x)BaTiO_3-xPbTiO_3$ containing a first main ingredient represented by $BaTiO_3$ and a second main ingredient represented by $PbTiO_3$, wherein x satisfies $0.0025 \leq x \leq 0.4$.

The dielectric ceramic composition according to the exemplary embodiment may satisfy the X5R (−55° C.-85° C.), X7R (−55° C.-125° C.), X8R (−55° C.-150° C.), and X9R (−55° C.-200° C.) characteristics of the Electronic Industries Association (EIA) standard.

In addition, the present disclosure may provide a multilayer ceramic capacitor using the dielectric ceramic composition. The multilayer ceramic capacitor may satisfy the temperature characteristics noted above, and may exhibit excellent reliability.

Hereinafter, each ingredient of the dielectric ceramic composition according to the exemplary embodiment will be described in detail.

a) Base Material Powder

The dielectric ceramic composition according to the exemplary embodiment may contain the base material powder represented by $(1-x)BaTiO_3-xPbTiO_3$ containing the first main ingredient represented by $BaTiO_3$ and the second main ingredient represented by $PbTiO_3$.

Here, x may satisfy $0.0025 \leq x \leq 0.4$.

The first main ingredient may be represented by $BaTiO_3$, wherein $BaTiO_3$, which is a material used in a general dielectric base material, is a ferroelectric material having a Curie temperature of about 125° C.

Further, the second main ingredient may be represented by $PbTiO_3$.

An intensity of spontaneous polarization of $PbTiO_3$, which is the second main ingredient, may be greater than that of $BaTiO_3$, which is the first main ingredient.

However, since mobility of a domain wall of $PbTiO_3$ is low, permittivity of $PbTiO_3$ may be low.

Generally, in order to allow a ferroelectric material to have high permittivity, the intensity of spontaneous polarization needs to be high, and the mobility of a domain wall needs to be great. Thus, polarizations should be easily switched depending on an external electric field direction.

According to the exemplary embodiment, the base material powder may contain the first main ingredient represented by $BaTiO_3$ and the second main ingredient represented by $PbTiO_3$. The second main ingredient represented by $PbTiO_3$ has a high intensity of spontaneous polarization as compared to the first main ingredient. The base material may contain a suitable amount of the second main ingredient, as discussed in more detail below. Thus, the base material may exhibit high permittivity even at a small grain size as compared to a base material represented by $BaTiO_3$ alone by improving mobility of the domain wall while increasing the intensity of the spontaneous polarization.

Therefore, a dielectric ceramic composition having excellent DC-bias characteristics while having high permittivity may be implemented.

That is, the base material powder of the dielectric ceramic composition according to the exemplary embodiment may be represented by $(1-x)BaTiO_3-xPbTiO_3$. The base material powder may thus contain the first main ingredient represented by $BaTiO_3$ and the second main ingredient represented by $PbTiO_3$, and a content of $PbTiO_3$, the second main ingredient, may satisfy $0.0025 \leq x \leq 0.4$. The base material powder may thus exhibit the above-mentioned effect.

When x is less than 0.0025, DC-bias characteristics may be deteriorated.

Meanwhile, when x is more than 0.4, room-temperature relative permittivity may be decreased to be less than 3000 (e.g., less than 3000 times the permittivity of vacuum).

Further, the base material powder of the dielectric ceramic composition may be in a state in which the first and second main ingredients are solid-dissolved in each other.

In a case in which the base material powder is in the state in which the first and second main ingredients are solid-dissolved in each other, the base material powder may be in a single phase state. Additionally, permittivity, temperature characteristics, temperature coefficient of capacitance (TCC), DC-bias characteristics, a dissipation factor, and the like, may be greater as compared to a case in which the first and second main ingredients are mixed with each other.

The base material powder is not particularly limited, but may have an average particle size of 1000 nm or less.

b) First Accessory Ingredient

According to the exemplary embodiment, the dielectric ceramic composition may further contain an oxide or carbonate containing at least one of Mn, V, Cr, Fe, Ni, Co, Cu, and Zn as a first accessory ingredient.

The oxide or carbonate containing at least one of Mn, V, Cr, Fe, Ni, Co, Cu, and Zn as the first accessory ingredient may be contained at a content of 0.1 to 2.0 mol % based on 100 mol % of the base material powder.

The first accessory ingredient may serve to decrease a sintering temperature of a multilayer ceramic capacitor using the dielectric ceramic composition, and may improve high-temperature withstand voltage characteristics.

The content of the first accessory ingredient and a content of a second accessory ingredient to be described below, which are based on 100 mol % of base material powder, may be particularly defined as mol % of metal ions contained in each of the accessory ingredients.

When the content of the first accessory ingredient is less than 0.1 mol %, a sintering temperature may be increased, and the high-temperature withstand voltage characteristics may be slightly deteriorated.

When the content of the first accessory ingredient is more than 2.0 mol %, the high-temperature withstand voltage characteristics and room-temperature resistivity may be deteriorated.

In particular, the dielectric ceramic composition according to the exemplary embodiment may further contain the first accessory ingredient having a content of 0.1 to 2.0 mol % based on 100 mol % of the base material powder. Thus, the dielectric ceramic composition may be sintered at a low temperature and may obtain excellent high-temperature withstand voltage characteristics.

c) Second Accessory Ingredient

According to the exemplary embodiment, the dielectric ceramic composition may contain an oxide containing Si or a glass compound containing Si as a second accessory ingredient.

The dielectric ceramic composition may further contain the second accessory ingredient, the oxide containing Si or the glass compound containing Si, at a content of 0.2 to 5.0 mol % based on 100 mol % of the base material powder.

The second accessory ingredient may serve to decrease the sintering temperature of the multilayer ceramic capacitor using the dielectric ceramic composition and improve the high-temperature withstand voltage characteristics.

When the content of the second accessory ingredient is less than 0.2 mol % based on 100 mol % of the base material powder, the sintering temperature may be increased.

When the content of the second accessory ingredient is more than 5.0 mol % based on 100 mol % of the base material powder, the high-temperature withstand voltage characteristics may be deteriorated.

In particular, the dielectric ceramic composition according to the exemplary embodiment may further contain the second accessory ingredient having a content of 0.2 to 5.0 mol % based on 100 mol % of the base material powder. Thus, the dielectric ceramic composition may be sintered at a low temperature and may obtain excellent high-temperature withstand voltage characteristics.

d) Third Accessory Ingredient

According to the exemplary embodiment, the dielectric ceramic composition may contain a third accessory ingredient, an oxide, carbonate, or fluoride containing Li.

The dielectric ceramic composition may contain the third accessory ingredient, the oxide, carbonate, or fluoride containing Li, at a content of 0.4 to 12.0 mol % based on 100 mol % of the base material powder.

The third accessory ingredient may serve to decrease the sintering temperature of the multilayer ceramic capacitor using the dielectric ceramic composition, and may improve the high-temperature withstand voltage characteristics.

In addition, the third accessory ingredient may obtain the desired characteristics of the multilayer ceramic capacitor even in a case in which copper (Cu) is used as an internal electrode.

When the content of the third accessory ingredient is less than 0.4 mol % based on 100 mol % of the base material powder, the sintering temperature may be increased, permittivity may be decreased, and high-temperature withstand voltage characteristics may be deteriorated.

When the content of the third accessory ingredient is more than 12.0 mol % based on 100 mol % of the base material powder, the high-temperature withstand voltage characteristics may be deteriorated due to formation of a secondary phase, or the like.

In particular, the dielectric ceramic composition according to the exemplary embodiment may further contain the third accessory ingredient having a content of 0.4 to 12.0 mol % based on 100 mol % of the base material powder. Thus, copper (Cu) may be used as the internal electrode, and the dielectric ceramic composition may be sintered at a low temperature and may obtain excellent high-temperature withstand voltage characteristics.

Figure 1:
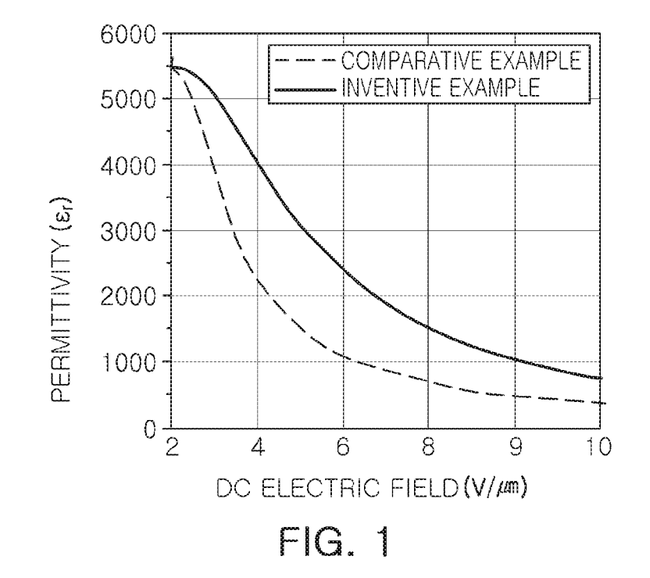
FIG. 1 is a graph illustrating changes in relative permittivity ($\in r$) versus a direct current (DC) electric field in an Inventive Example and a Comparative Example.

FIG. 1 is a graph illustrating changes in relative permittivity ($\in r$) versus a direct current (DC) electric field in an Inventive Example. In the Inventive Example, a base material powder is used that is represented by $(1-x)BaTiO_3-xPbTiO_3$ containing a first main ingredient represented by $BaTiO_3$ and a second main ingredient represented by $PbTiO_3$. In the Comparative Example, a base material powder is used that is represented by $BaTiO_3$, in accordance with the related art.

Referring to FIG. 1, it may be appreciated that, in a case of using the base material powder represented by $(1-x)BaTiO_3-xPbTiO_3$ containing the first main ingredient represented by $BaTiO_3$ and the second main ingredient represented by $PbTiO_3$ (as in the Inventive Example of FIG. 1), DC-bias characteristics (and permittivity) may be excellent as compared to a Comparative Example in which a commercialized $BaTiO_3$ X5R dielectric material having a Curie temperature of 125° C. is used (e.g., as in the Comparative Example of FIG. 1).

Figure 2:
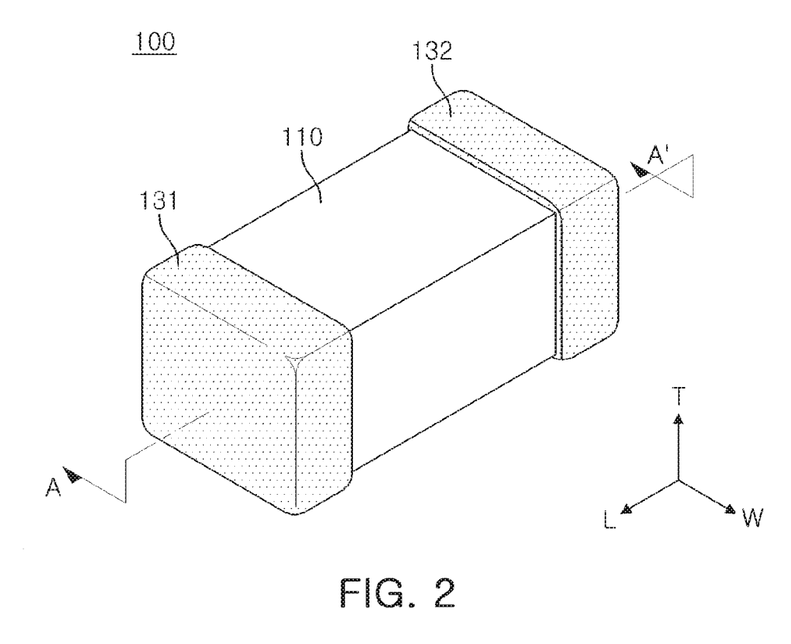
FIG. 2 is a schematic perspective view illustrating a multilayer ceramic capacitor according to an exemplary embodiment.
Figure 3:
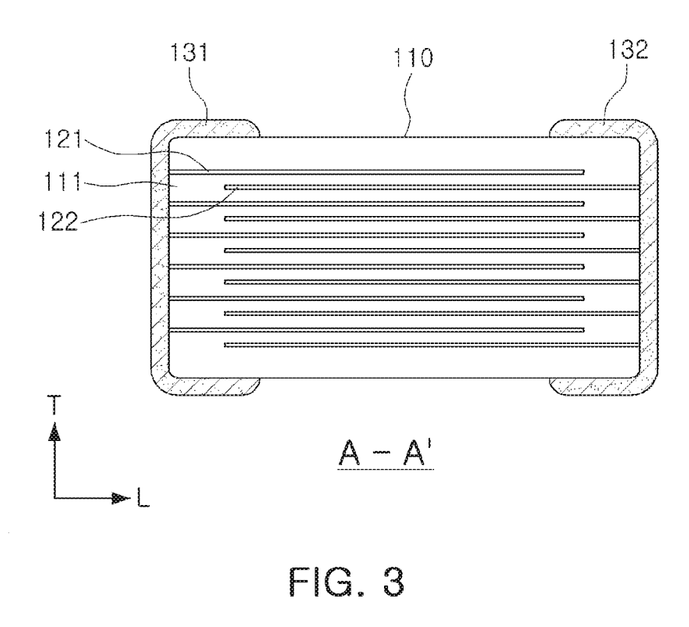
FIG. 3 is a schematic cross-sectional view illustrating the multilayer ceramic capacitor, taken along line A-A' of FIG. 2.

FIG. 2 is a schematic perspective view illustrating a multilayer ceramic capacitor 100 according to an exemplary embodiment, and FIG. 3 is a schematic cross-sectional view illustrating the multilayer ceramic capacitor 100 taken along line A-A' of FIG. 2.

Referring to FIGS. 2 and 3, the multilayer ceramic capacitor 100 according to another exemplary embodiment may include a ceramic body 110 in which dielectric layers 111 and first and second internal electrodes 121 and 122 are alternately stacked. First and second external electrodes 131 and 132 respectively electrically connected to the first and second internal electrodes 121 and 122 alternately disposed in the ceramic body 110, may be formed on both end portions of the ceramic body 110.

A shape of the ceramic body 110 is not particularly limited, but may generally be a hexahedral shape. In addition, dimensions of the ceramic body 110 are not particularly limited, and the ceramic body may have suitable dimensions depending on use or application. For example, the ceramic body may have dimensions of (0.6-5.6 mm)×(0.3-5.0 mm)× (0.3-1.9 mm).

A thickness of the dielectric layer 111 may be optionally changed according to capacitance design of the capacitor. According to the exemplary embodiment, a thickness of a single dielectric layer after sintering may preferably be 0.2 µm or more. The thickness of the single dielectric layer may correspond to a spacing between two adjacent internal electrodes 121 and 122.

In a case in which the dielectric layer has an excessively reduced thickness, the number of grains existing in the single dielectric layer is low, which has a negative influence on reliability. Therefore, the thickness of the dielectric layer may be 0.2 µm or more. For example, when the dielectric layer has an excessively reduced thickness, the dielectric layer may only include a limited number of grains of the base material powder stacked within the thickness of the layer.

The first and second internal electrodes 121 and 122 may be stacked so that end surfaces thereof are exposed to surfaces of alternating end portions of the ceramic body 110 opposing each other, as shown in FIG. 3.

The first and second external electrodes 131 and 132 may be formed on both end portions of the ceramic body 110 and respectively electrically connected to the exposed end surfaces of the first and second internal electrodes 121 and 122, thereby configuring a capacitor circuit.

Although a conductive material contained in the first and second internal electrodes 121 and 122 is not particularly limited, according to the exemplary embodiment, palladium (Pd), copper (Cu), or nickel (Ni) may be used.

A thickness of the first and second internal electrodes 121 and 122 may be appropriately determined depending on use, or the like, but is not particularly limited. For example, the thickness may be within the range of 0.1 µm to 5 µm or the range of 0.1 µm to 2.5 µm.

A conductive material contained in the first and second external electrodes 131 and 132 is not particularly limited, but nickel (Ni), copper (Cu), or alloys thereof may be used.

A thickness of the first and second external electrodes 131 and 132 may be appropriately determined depending on use, or the like, but is not particularly limited. For example, the thickness of the external electrodes 131 and 132 may be 10 µm to 50 µm.

The dielectric layers 111 configuring the ceramic body 110 may contain the dielectric ceramic composition according to the exemplary embodiment.

The dielectric ceramic composition may contain a base material powder represented by $(1-x)BaTiO_3-xPbTiO_3$ containing a first main ingredient represented by $BaTiO_3$ and a second main ingredient represented by $PbTiO_3$, wherein x satisfies $0.0025 \leq x \leq 0.4$.

Since features of the dielectric ceramic composition are the same as those of the dielectric ceramic composition according to the exemplary embodiment described above, a detailed description thereof will be omitted.

Hereinafter, the present disclosure will be described in detail through Inventive Examples and Comparative Examples, which are provided to help in the specific understanding of the present disclosure. Therefore, the scope of the present disclosure is not limited to the Inventive Examples.

A raw material powder containing $(1-x)BaTiO_3-xPbTiO_3$ as a main ingredient and having an average particle size of 300 nm was used as main ingredient powder.

After each of the ingredients were weighed according to composition ratios illustrated in the following Tables 1 and 3, and mixed with a dispersant using ethanol and toluene as solvents, a binder was mixed with the mixture, thereby manufacturing a ceramic sheet.

A palladium (Pd) internal electrode was printed on ceramic sheets formed according to the compositions illustrated in the following Table 1, and a copper (Cu) internal electrode was printed on ceramic sheets formed according to the compositions illustrated in the following Table 3.

As upper and lower cover layers, 25 formed sheets having a thickness of 10 μm to 13 μm were stacked, and 21 sheets on which the internal electrode having a thickness of about 2.0 μm was printed were stacked to form an active layer, thereby manufacturing a bar.

A compressed bar was cut into chips having a 3216 size (length×width×thickness: 3.2 mm×1.6 mm×1.6 mm) using a cutter.

After the cut chips were calcined, chip samples corresponding to the following Table 1 were sintered at a temperature range of 1180° C. to 1250° C. under an air atmosphere, and chip samples corresponding to the following Table 3 were sintered in a temperature range of 940° C. to 980° C. under a reduction atmosphere (0.1% $H_2$/99% $N_2$, $H_2O/H_2/N_2$).

External electrodes were completed by terminating the sintered chips using a copper (Cu) paste and sintering the formed electrodes.

Capacitance, dissipation factors (DF), insulation resistance, temperature coefficients of capacitance (TCCs), resistance degradation behaviors depending on a voltage step increase at a high temperature of 150° C., and the like, of prototype multilayer ceramic capacitor (MLCC) samples completed as described above were evaluated.

The room-temperature capacitance and dissipation factors of the multilayer ceramic capacitor (MLCC) were measured at 1 kHz and an AC voltage of 0.5 V/μm using an LCR-meter.

Permittivity of the multilayer ceramic capacitor (MLCC) was calculated from the capacitance, a thickness of a dielectric layer, an area of the internal electrodes, and the number of stacked dielectric layers of the multilayer ceramic capacitor (MLCC).

Room-temperature insulation resistance (IR) was measured after 60 seconds in a state in which ten samples each were taken and a DC voltage of 10 V/μm was applied thereto.

The temperature coefficient of capacitance (TCC) was measured at a temperature range from −55° C. to 125° C.

In a high-temperature IR boosting test, resistance degradation behavior was measured while increasing the voltage step by 5 V/μm at 150° C., and a resistance value was measured every 5 seconds, wherein the time of each step was 10 minutes.

The high-temperature withstand voltage was derived from the high-temperature IR boosting test, wherein the high-temperature withstand voltage is defined as a voltage at which IR may withstand $10^5 \Omega$ or more when the measurement was conducted while continuously increasing the voltage step after applying the voltage step of DC 5 V/μm to a 3216 size chip having 20 dielectric layers having a thickness of 7 μm after sintering at 150° C. for 10 minutes.

The RC value is a product of a room-temperature capacitance value measured at AC 0.5 V/μm and 1 kHz, and an insulation resistance value measured at DC 10 V/μm.

A fine structure of the dielectric layer was observed using a scanning electron microscope (SEM), and a grain size was calculated from the SEM image.

TABLE 1

| Experimental Example | Molar Ratio of Each Ingredient of Base Material $(1-x)BaTiO_3 + xPbTiO_3$ | | Content (mole) of Each Additive Based on 100 Moles of Base Material BT-PT | | | | |
|---|---|---|---|---|---|---|---|
| | First Main Ingredient $BaTiO_3$ $(1-x)$ | Second Main Ingredient $PbTiO_3$ $(x)$ | 1st Accessory Ingredient | | 2nd Accessory Ingredient | 3rd Accessory Ingredient | |
| | | | $MnO_2$ | $V_2O_5$ | $SiO_2$ | $Li_2CO_3$ | LiF |
| 1 | 1.000 | 0.0000 | 0.500 | 0.000 | 0.50 | 0.00 | 0.00 |
| 2 | 0.998 | 0.0025 | 0.000 | 0.000 | 0.50 | 0.00 | 0.00 |
| 3 | 0.995 | 0.0050 | 0.500 | 0.000 | 0.50 | 0.00 | 0.00 |
| 4 | 0.990 | 0.0100 | 0.500 | 0.000 | 0.50 | 0.00 | 0.00 |
| 5 | 0.975 | 0.0250 | 0.500 | 0.000 | 0.50 | 0.00 | 0.00 |
| 6 | 0.950 | 0.0500 | 0.500 | 0.000 | 0.50 | 0.00 | 0.00 |
| 7 | 0.925 | 0.0750 | 0.500 | 0.000 | 0.50 | 0.00 | 0.00 |
| 8 | 0.900 | 0.1000 | 0.500 | 0.000 | 0.50 | 0.00 | 0.00 |
| 9 | 0.800 | 0.2000 | 0.500 | 0.000 | 0.50 | 0.00 | 0.00 |
| 10 | 0.700 | 0.3000 | 0.500 | 0.000 | 0.50 | 0.00 | 0.00 |
| 11 | 0.600 | 0.4000 | 0.500 | 0.000 | 0.50 | 0.00 | 0.00 |
| 12 | 0.950 | 0.0500 | 0.000 | 0.000 | 0.50 | 0.00 | 0.00 |
| 13 | 0.950 | 0.0500 | 0.100 | 0.000 | 0.50 | 0.00 | 0.00 |
| 14 | 0.950 | 0.0500 | 0.200 | 0.000 | 0.50 | 0.00 | 0.00 |
| 15 | 0.950 | 0.0500 | 1.000 | 0.000 | 0.50 | 0.00 | 0.00 |
| 16 | 0.950 | 0.0500 | 2.000 | 0.000 | 0.50 | 0.00 | 0.00 |
| 17 | 0.950 | 0.0500 | 3.000 | 0.000 | 0.50 | 0.00 | 0.00 |
| 18 | 0.950 | 0.0500 | 0.250 | 0.125 | 0.50 | 0.00 | 0.00 |
| 19 | 0.950 | 0.0500 | 1.000 | 0.500 | 0.50 | 0.00 | 0.00 |
| 20 | 0.950 | 0.0500 | 1.500 | 0.750 | 0.50 | 0.00 | 0.00 |
| 21 | 0.950 | 0.0500 | 0.000 | 0.250 | 0.50 | 0.00 | 0.00 |

TABLE 1-continued

| Experimental Example | Molar Ratio of Each Ingredient of Base Material $(1-x)BaTiO_3 + xPbTiO_3$ | | Content (mole) of Each Additive Based on 100 Moles of Base Material BT-PT | | | | |
|---|---|---|---|---|---|---|---|
| | First Main Ingredient $BaTiO_3$ $(1-x)$ | Second Main Ingredient $PbTiO_3$ $(x)$ | 1st Accessory Ingredient | | 2nd Accessory Ingredient | 3rd Accessory Ingredient | |
| | | | $MnO_2$ | $V_2O_5$ | $SiO_2$ | $Li_2CO_3$ | LiF |
| 22 | 0.950 | 0.0500 | 0.000 | 1.000 | 0.50 | 0.00 | 0.00 |
| 23 | 0.950 | 0.0500 | 0.000 | 1.500 | 0.50 | 0.00 | 0.00 |
| 24 | 0.950 | 0.0500 | 0.500 | 0.000 | 0.00 | 0.00 | 0.00 |
| 25 | 0.950 | 0.0500 | 0.500 | 0.000 | 0.20 | 0.00 | 0.00 |
| 26 | 0.950 | 0.0500 | 0.500 | 0.000 | 1.00 | 0.00 | 0.00 |
| 27 | 0.950 | 0.0500 | 0.500 | 0.000 | 2.00 | 0.00 | 0.00 |
| 28 | 0.950 | 0.0500 | 0.500 | 0.000 | 5.00 | 0.00 | 0.00 |
| 29 | 0.950 | 0.0500 | 0.500 | 0.000 | 7.00 | 0.00 | 0.00 |

The following Table 2 illustrates characteristics of prototype multilayer ceramic capacitors (MLCCs) corresponding to the compositions illustrated in Table 1, including the unexpected results providing improved operation of MLCCs as detailed herein.

was 0.5 moles based on 100 moles of a main ingredient $(1-x)BaTiO_3+xPbTiO_3$. In the different experimental Examples 1 to 11, a content $(1-x)$ of a first main ingredient and a content $(x)$ of a second main ingredient were changed. Table 2 indicates characteristics of prototype multilayer

TABLE 2

SPL Characteristics of Pd-MLCC Proto-Type
(Permittivity/DF Measurement Condition: AC 0.5 V/um, 1 kHz)
(Room-Temperature Specific Resistance: DC 10 V/um)

| Experimental Example | Grain Size (um) | Room-Temperature Permittivity | DF (%) | RC value (Ohm-cm) | TCC (%) (85° C.) | TCC (%) (125° C.) | DC-bias Capacitance Change Rate (@DC3 V/um) | High-Temperature Withstand Voltage (V/um)* (150° C.) | Judgment |
|---|---|---|---|---|---|---|---|---|---|
| 1 | 1.80 | 5624.0 | 12.50 | 2586 | 1.2% | −19.5% | −66.0% | 60 | X |
| 2 | 1.40 | 5471.0 | 11.20 | 2631 | 0.8% | −18.4% | −54.9% | 60 | X |
| 3 | 0.60 | 5483.0 | 10.60 | 2665 | 0.5% | −14.8% | −46.5% | 65 | ○ |
| 4 | 0.40 | 5623.0 | 9.30 | 2734 | 1.1% | −12.5% | −40.4% | 70 | ○ |
| 5 | 0.30 | 5689.0 | 8.50 | 2846 | 1.7% | −8.2% | −34.2% | 80 | ○ |
| 6 | 0.30 | 5732.0 | 7.70 | 3045 | 2.4% | −4.7% | −32.7% | 85 | ○ |
| 7 | 0.30 | 5214.0 | 6.80 | 3114 | 2.6% | −2.5% | −31.8% | 85 | ○ |
| 8 | 0.30 | 4856.0 | 6.20 | 3220 | 2.8% | −1.3% | −30.6% | 85 | ○ |
| 9 | 0.30 | 4427.0 | 5.90 | 3048 | 3.1% | −0.4% | −28.4% | 85 | ○ |
| 10 | 0.30 | 3628.0 | 4.80 | 2748 | 3.5% | 1.2% | −25.7% | 75 | ○ |
| 11 | 0.30 | 2967.0 | 3.50 | 2531 | 4.1% | 1.6% | −23.5% | 65 | X |
| 12 | 0.30 | 6627.0 | 14.8 | 12 | — | — | — | 5 | X |
| 13 | 0.30 | 6483.0 | 11.20 | 1128 | 2.6% | −5.7% | 37.5% | 55 | ○ |
| 14 | 0.30 | 6081.0 | 10.60 | 1647 | 2.4% | −5.3% | −36.4% | 60 | ○ |
| 15 | 0.30 | 4523.0 | 5.84 | 3127 | 1.6% | −2.3% | −29.9% | 80 | ○ |
| 16 | 0.30 | 3368.0 | 4.26 | 1542 | 1.4% | 0.2% | −26.4% | 70 | ○ |
| 17 | 0.30 | 2394.0 | 3.12 | 987 | 1.2% | 0.5% | −22.6% | 60 | X |
| 18 | 0.30 | 5804.0 | 7.86 | 2956 | 2.7% | −4.5% | −33.4% | 90 | ○ |
| 19 | 0.30 | 3526.0 | 4.44 | 1371 | 1.5% | 0.5% | −27.2% | 75 | ○ |
| 20 | 0.30 | 2455.0 | 3.48 | 842 | 1.5% | 0.8% | −21.5% | 60 | X |
| 21 | 0.30 | 5645.0 | 7.23 | 2879 | 2.8% | −4.2% | −31.8% | 85 | ○ |
| 22 | 0.30 | 3256.0 | 4.12 | 1485 | 1.8% | 0.5% | −25.7% | 70 | ○ |
| 23 | 0.30 | 2248.0 | 2.95 | 886 | 1.6% | 0.7% | −22.8% | 60 | X |
| 24 | 0.30 | 1856.0 | 1.88 | 785 | — | — | — | 5 | X |
| 25 | 0.30 | 5046.0 | 6.55 | 2845 | 1.2% | −4.0% | −31.1% | 65 | ○ |
| 26 | 0.30 | 5234.0 | 7.26 | 2948 | 2.1% | −4.8% | −33.5% | 80 | ○ |
| 27 | 0.30 | 4538.0 | 6.18 | 2572 | 3.4% | −1.1% | −27.8% | 70 | ○ |
| 28 | 0.30 | 3214.0 | 3.71 | 2684 | 3.6% | 0.8% | −24.5% | 60 | ○ |
| 29 | 0.30 | 2648.0 | 2.90 | 1847 | 4.4% | 1.9% | −22.2% | 45 | X |

Experimental Examples 1 to 11 of Table 1 indicate cases in which when a content of a first accessory ingredient $MnO_2$ was 0.5 moles and a second accessory ingredient $SiO_2$ ceramic capacitor samples using Pd-internal electrodes corresponding thereto, and sintered under an air atmosphere, in accordance with the Experimental Examples 1 to 11.

It may be confirmed that as the content (x) of PbTiO$_3$ was increased, the grain size tended to decrease but become constant again, and room-temperature permittivity tended to maintain a relatively constant value but decrease again.

It may be appreciated that in Experimental Example 1 in which PbTiO$_3$ was not added, since room-temperature permittivity was relatively high (5624 or so), but a grain size was large (1.8 μm or so), a DC-bias capacitance change rate was about −66.0% or so, and thus there was a problem in the DC-bias characteristics.

On the contrary, it may be confirmed that in Experimental Example 6, in which the content (x) of PbTiO$_3$ was 0.05, since room-temperature permittivity was 5732, which was equal to or more than that of Experimental Example 1, but a grain size was small (0.3 μm), a DC-bias capacitance change rate was −32.7%, and thus excellent DC-bias characteristics were implemented.

In Experimental Example 11, in which the content (x) of PbTiO$_3$ was excessively high (0.4 or more), there was problem in that room-temperature permittivity was decreased to be less than 3000.

It may be appreciated that when the content (x) of PbTiO$_3$ was in a range of 0.005 to 0.3 (Experimental Examples 3 to 10), room-temperature permittivity of 3000 or more, an RC value of 1000 Ohm-F or more, TCC (125° C.) of less than ±15%, a DC-bias capacitance change rate of less than ±50%, and high temperature withstand voltage (150° C.) of 50V/um or more, the desired characteristics of the present disclosure, may be simultaneously implemented.

Experimental Examples 12 to 17 of Table 1 indicate cases in which when the content (1−x) of the first main ingredient was 0.95 and the content (x) of the second main ingredient was 0.05, and the content of the second accessory ingredient SiO$_2$ was 0.5 moles based on 100 moles of the main ingredient (1−x)BaTiO$_3$+xPbTiO$_3$. The content of the first accessory ingredient Mn was changed in the various examples, and Experimental Examples 12 to 17 of Table 2 thus indicate characteristics of prototype multilayer ceramic capacitor samples using Pd-internal electrodes corresponding thereto, and sintered under an air atmosphere.

In a case in which the content of the first accessory ingredient Mn was 0 (Experimental Example 12), there was problem in that a RC value and high temperature withstand voltage (150° C.) were significantly low. On the contrary, in a case in which the content of Mn was excessively high (3 moles) as in Experimental Example 17, room-temperature permittivity was decreased to be less than 3000.

It may be confirmed that when the content of Mn is in a range of 0.1 to 2.0 mol % (Experimental Examples 12 to 16), the desired characteristics of the present disclosure may be implemented.

Experimental Examples 18 to 23 of Table 1 indicate cases in which MnO$_2$ was partially or entirely changed into V$_2$O$_5$ in the first accessory ingredient, and Experimental Examples 18 to 23 of Table 2 indicate characteristics of proto-type multilayer ceramic capacitor samples corresponding thereto.

It may be confirmed that, when regardless of the kind of Mn, V, or the like, the contents of the first accessory ingredient were the same as each other based on atomic % (at %), almost the same characteristics were implemented.

It may be confirmed that in Experimental Examples 6, 18, and 21 in which the content of the first accessory ingredient was 0.5 at %, characteristics were almost the same as each other, and in Experimental Examples 16, 19, and 22 in which the content of the first accessory ingredient was 2.0 at %, characteristics were also almost the same as each other.

In addition, in all of the Experimental Examples 17, 20, and 23 in which the content of the first accessory ingredient was excessively high (3.0 at %), room-temperature permittivity was less than 3000.

Therefore, it may be appreciated that a suitable content of a transition metal element of the first accessory ingredient was 0.1 to 2.0 at % as an element ratio.

Experimental Examples 24 to 29 of Table 1 indicate cases in which when the content (1−x) of the first main ingredient was 0.95 and the content (x) of the second main ingredient was 0.05, and the content of the first accessory ingredient MnO$_2$ was 0.5 moles based on 100 moles of a main ingredient (1−x)BaTiO$_3$+xPbTiO$_3$. In these examples, the content of the second accessory ingredient SiO$_2$ was changed, and Experimental Examples 24 to 29 of Table 2 indicate characteristics of proto-type multilayer ceramic capacitor samples using Pd-internal electrodes corresponding thereto, and sintered under an air atmosphere.

In a case in which the content of the second accessory ingredient SiO$_2$ was 0 mole (Experimental Example 24), a sintering property was deteriorated, and thus permittivity and high-temperature withstand voltage characteristics were significantly low.

On the contrary, it may be appreciated that in a case in which the content of SiO$_2$ was excessively high (7 moles, Experimental Example 29), room-temperature permittivity and high-temperature withstand voltage characteristics were also significantly low.

It may be confirmed that in Experimental Examples 25 to 28 in which the content of the second accessory ingredient SiO$_2$ was in a range of 0.2 to 5.0 moles, the desired characteristics of the present disclosure may be implemented.

Therefore, it may be appreciated that a suitable content of an element of the second accessory ingredient was 0.1 to 2.0 at % as an element ratio.

TABLE 3

| Experimental Example | Molar Ratio of Each Ingredient of Base Material (1 − x)BaTiO$_3$ + xPbTiO$_3$ | | Content (mole) of Each Additive Based on 100 Moles of Base Material BT-PT | | | | |
|---|---|---|---|---|---|---|---|
| | First Main Ingredient BaTiO$_3$ (1 − x) | Second Main Ingredient PbTiO$_3$ (x) | 1st Accessory Ingredient | | 2nd Accessory Ingredient | 3rd Accessory Ingredient | |
| | | | MnO$_2$ | V$_2$O$_5$ | SiO$_2$ | Li$_2$CO$_3$ | LiF |
| 30 | 0.950 | 0.0500 | 0.500 | 0.000 | 0.50 | 0.05 | 0.00 |
| 31 | 0.950 | 0.0500 | 0.500 | 0.000 | 0.50 | 0.20 | 0.00 |
| 32 | 0.950 | 0.0500 | 0.500 | 0.000 | 0.50 | 0.50 | 0.00 |

TABLE 3-continued

| | Molar Ratio of Each Ingredient of Base Material $(1-x)\text{BaTiO}_3 + x\text{PbTiO}_3$ | | Content (mole) of Each Additive Based on 100 Moles of Base Material BT-PT | | | | |
|---|---|---|---|---|---|---|---|
| | First Main Ingredient BaTiO$_3$ | Second Main Ingredient PbTiO$_3$ | 1st Accessory Ingredient | | 2nd Accessory Ingredient | 3rd Accessory Ingredient | |
| Experimental Example | $(1-x)$ | $(x)$ | MnO$_2$ | V2O5 | SiO$_2$ | Li$_2$CO$_3$ | LiF |
| 33 | 0.950 | 0.0500 | 0.500 | 0.000 | 0.50 | 1.00 | 0.00 |
| 34 | 0.950 | 0.0500 | 0.500 | 0.000 | 0.50 | 3.00 | 0.00 |
| 35 | 0.950 | 0.0500 | 0.500 | 0.000 | 0.50 | 6.00 | 0.00 |
| 36 | 0.950 | 0.0500 | 0.500 | 0.000 | 0.50 | 8.00 | 0.00 |
| 37 | 0.950 | 0.0500 | 0.500 | 0.000 | 0.50 | 0.00 | 0.10 |
| 38 | 0.950 | 0.0500 | 0.500 | 0.000 | 0.50 | 0.00 | 0.40 |
| 39 | 0.950 | 0.0500 | 0.500 | 0.000 | 0.50 | 0.00 | 1.00 |
| 40 | 0.950 | 0.0500 | 0.500 | 0.000 | 0.50 | 0.00 | 2.00 |
| 41 | 0.950 | 0.0500 | 0.500 | 0.000 | 0.50 | 0.00 | 6.00 |
| 42 | 0.950 | 0.0500 | 0.500 | 0.000 | 0.50 | 0.00 | 12.00 |
| 43 | 0.950 | 0.0500 | 0.500 | 0.000 | 0.50 | 0.00 | 16.00 |

The following Table 4 illustrates characteristics of proto-type multilayer ceramic capacitors (MLCCs) corresponding to the compositions illustrated in Table 3, including the unexpected results providing improved operation of MLCCs as detailed herein.

TABLE 4

SPL Characteristics of Cu-MLCC Proto-Type
(Permittivity/DF Measurement Condition: AC 0.5 V/um, 1 kHz)
(Room-Temperature Specific Resistance: DC 10 V/um)

| Experimental Example | Grain Size (um) | Room-Temperature Permittivity | DF (%) | RC value (Ohm-cm) | TCC (%) (85° C.) | TCC (%) (125° C.) | DC-bias Capacitance Change Rate (@DC3.0 V/um) | High-Temperature Withstand Voltage (V/um)* (150° C.) | Judgment |
|---|---|---|---|---|---|---|---|---|---|
| 30 | 0.30 | 2567.0 | 3.10 | 842 | 2.4% | −4.9% | −25.5% | 45 | X |
| 31 | 0.30 | 4684.0 | 7.50 | 1846 | 2.5% | −4.8% | 30.0% | 65 | ○ |
| 32 | 0.30 | 5474.0 | 7.20 | 2784 | 2.6% | −4.5% | −32.5% | 85 | ○ |
| 33 | 0.30 | 5326.0 | 7.10 | 2653 | 2.8% | −4.2% | −30.8% | 85 | ○ |
| 34 | 0.30 | 5042.0 | 6.50 | 2456 | 2.5% | −4.0% | −30.4% | 75 | ○ |
| 35 | 0.30 | 4695.0 | 6.20 | 2371 | 2.6% | −3.6% | −29.5% | 55 | ○ |
| 36 | 0.30 | 3857.0 | 3.50 | 1854 | 2.9% | −3.1% | −27.2% | 40 | X |
| 37 | 0.30 | 2423.0 | 2.80 | 746 | 1.8% | −5.4% | −26.8% | 45 | X |
| 38 | 0.30 | 4752.0 | 7.20 | 1945 | 2.1% | −5.4% | −31.1% | 60 | ○ |
| 39 | 0.30 | 5562.0 | 7.10 | 2888 | 2.3% | −5.2% | −33.5% | 80 | ○ |
| 40 | 0.30 | 5426.0 | 7.00 | 2746 | 2.4% | −5.0% | −30.5% | 80 | ○ |
| 41 | 0.30 | 5033.0 | 6.20 | 2359 | 2.7% | −4.8% | −31.4% | 75 | ○ |
| 42 | 0.30 | 4550.0 | 6.10 | 2416 | 2.8% | −4.3% | −30.5% | 55 | ○ |
| 43 | 0.30 | 3784.0 | 3.30 | 1665 | 3.0% | −3.5% | −26.5% | 40 | X |

Experimental Examples 30 to 36 of Table 3 indicate cases in which when the content (1−x) of the first main ingredient was 0.95 and the content (x) of the second main ingredient was 0.05, the content of the first accessory ingredient MnO$_2$ was 0.5 moles, and the content of the second accessory ingredient SiO$_2$ was 0.5 moles based on 100 moles of the main ingredient (1−x)BaTiO$_3$+xPbTiO$_3$. In these various examples, a content of a third accessory ingredient Li$_2$CO$_3$ was changed, and Experimental Examples 30 to 36 of Table 4 indicate characteristics of proto-type multilayer ceramic capacitor samples using Cu internal electrodes corresponding thereto, and sintered at 950° C. under an N$_2$ atmosphere.

In a case in which the content of Li$_2$CO$_3$ was low (for example, 0.05 moles, Experimental Example 30), when sintering was conducted at 950° C., a sintering property was deteriorated, and thus permittivity was low (less than 300), and high-temperature withstand voltage was decreased to be less than 50V/μm.

On the contrary, in a case in which the content of Li$_2$CO$_3$ was excessively high (8 moles), high-temperature withstand voltage was also decreased to be less than 50V/μm due to formation of a secondary phase, or the like.

It may be confirmed that in cases in which the content of Li$_2$CO$_3$ was in a range of 0.2 to 6 moles (Experimental Examples 31 to 35), while the Cu internal electrodes were used, the desired characteristics of the present disclosure may be implemented.

Experimental Examples 37 to 43 of Table 3 indicate cases in which a content of a third accessory ingredient LiF was changed, and Experimental Examples 37 to 43 of Table 4 indicate characteristics of prototype multilayer ceramic capacitor samples using Cu internal electrodes corresponding thereto, and sintered at 950° C. under an N$_2$ atmosphere.

It may be confirmed that when the content of lithium was equal based on at %, in cases of using Li$_2$CO$_3$ and cases of using LiF, almost the same characteristics were implemented (Examples 30 and 37, Examples 32 and 39, Examples 34 and 41, Examples 35 and 42, and Examples 36 and 43 correspond to these cases, respectively).

Therefore, a suitable content of the third accessory ingredient capable of implementing the desired characteristics of the present disclosure while using the Cu internal electrodes as well as the Ni internal electrodes may be 0.4 to 12 mol % as a Li element ratio.

As set forth above, according to exemplary embodiments, the dielectric ceramic composition having excellent DC-bias characteristics while having high permittivity and the multilayer ceramic capacitor containing the same may be implemented by forming a complex of $BaTiO_3$, which is the main ingredient of the dielectric layers, and $PbTiO_3$ of which the intensity of spontaneous polarization is large at a suitable content ratio.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body in which dielectric layers and first and second internal electrodes are alternately stacked; and
   first and second external electrodes disposed on end portions of the ceramic body and respectively electrically connected to the first and second internal electrodes,
   wherein the dielectric layers formed using a dielectric ceramic composition containing a base material powder represented by $(1-x)BaTiO_3-xPbTiO_3$ containing a first main ingredient represented by $BaTiO_3$ and a second main ingredient represented by $PbTiO_3$, x satisfying $0.06 < x \leq 0.4$, and
   wherein the base material powder has an average particle size of 1000 nm or less.

2. The multilayer ceramic capacitor of claim 1, wherein the dielectric ceramic composition further contains 0.1 to 2.0 mol % of a first accessory ingredient based on 100 mol % of the base material powder, and the first accessory ingredient is an oxide or carbonate containing at least one of Mn, V, Cr, Fe, Ni, Co, Cu, and Zn.

3. The multilayer ceramic capacitor of claim 1, wherein the dielectric ceramic composition further contains 0.2 to 5.0 mol % of a second accessory ingredient based on 100 mol % of the base material powder, and the second accessory ingredient is an oxide containing Si or a glass compound containing Si.

4. The multilayer ceramic capacitor of claim 1, wherein the dielectric ceramic composition further contains 0.4 to 12.0 mol % of a third accessory ingredient based on 100 mol % of the base material powder, and the third accessory ingredient is an oxide, carbonate, or fluoride containing Li.

5. The multilayer ceramic capacitor of claim 1, wherein the first and second main ingredients are solid-dissolved in each other.

6. A multilayer ceramic capacitor comprising:
   pluralities of first and second internal electrodes that are alternately stacked; and
   a plurality of dielectric layers disposed between adjacent internal electrodes of the stacked first and second internal electrodes,
   wherein the dielectric layers contain a dielectric ceramic composition containing a base material powder represented by $(1-x)BaTiO_3-xPbTiO_3$ containing $BaTiO_3$ and $PbTiO_3$, where x satisfies $0.06 < x \leq 0.4$, and
   wherein the dielectric ceramic composition of the dielectric layers is formed using a base material powder having an average particle size of 300 nm.

7. The multilayer ceramic capacitor of claim 6, wherein the $BaTiO_3$ and $PbTiO_3$ are solid-dissolved in each other.

8. The multilayer ceramic capacitor of claim 6, wherein the dielectric ceramic composition further contains 0.1 to 2.0 mol % of a first accessory ingredient based on 100 mol % of the base material powder, and the first accessory ingredient is an oxide or carbonate containing at least one of Mn, V, Cr, Fe, Ni, Co, Cu, and Zn.

9. The multilayer ceramic capacitor of claim 6, wherein the dielectric ceramic composition further contains 0.2 to 5.0 mol % of a second accessory ingredient based on 100 mol % of the base material powder, and the second accessory ingredient is an oxide containing Si or a glass compound containing Si.

10. The multilayer ceramic capacitor of claim 6, wherein the dielectric ceramic composition further contains 0.4 to 12.0 mol % of a third accessory ingredient based on 100 mol % of the base material powder, and the third accessory ingredient is an oxide, carbonate, or fluoride containing Li.

11. The multilayer ceramic capacitor of claim 10, wherein the first and second internal electrodes include copper (Cu).

12. The multilayer ceramic capacitor of claim 6, wherein the first and second internal electrodes include palladium (Pd).

13. The multilayer ceramic capacitor of claim 1, wherein the base material powder has an average particle size of 300 nm.

* * * * *